L. G. STURDEVANT.
Cotton Gin.
No. 2,190.
Patented July 23, 1841.
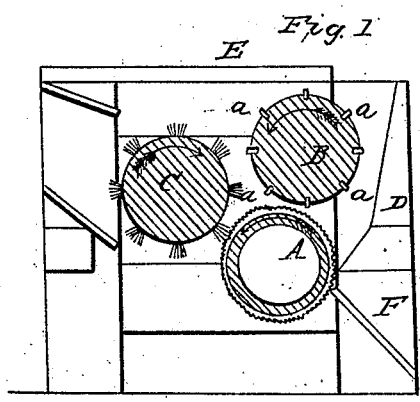
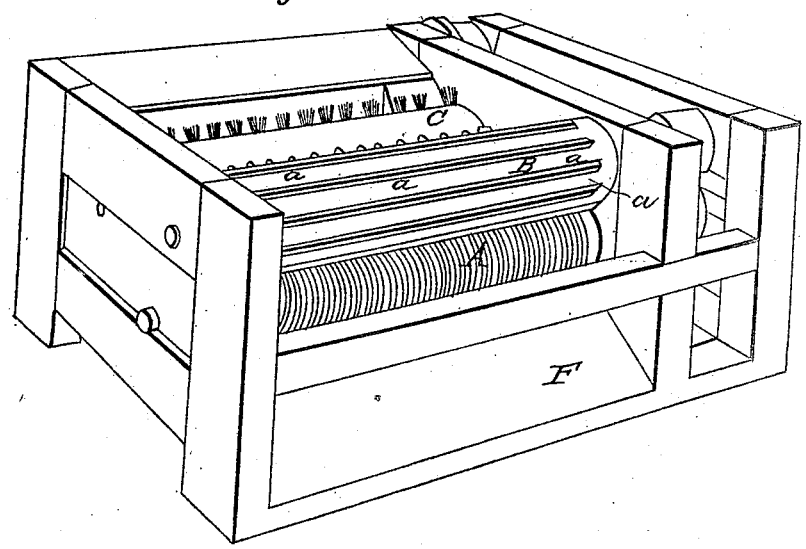

UNITED STATES PATENT OFFICE.

LEWIS G. STURDEVANT, OF DELAWARE, OHIO.

IMPROVEMENT IN THE MANNER OF CONSTRUCTING GINS FOR GINNING COTTON.

Specification forming part of Letters Patent No. 2,190, dated July 23, 1841.

*To all whom it may concern:*

Be it known that I, LEWIS G. STURDEVANT, of Delaware, in the county of Delaware and State of Ohio, have invented an Improvement in the Manner of Constructing the Gin for the Ginning of Cotton or of Separating the Same from the Seeds, of which the following is a specification.

In my cotton-gin, instead of the cylinder of saws which operate between ribs in the ordinary cotton-gin, I use a cylinder the surface of which I cover with fine teeth. Over this cylinder I place another, which is provided with beaters consisting of strips of iron placed edgewise and extending from end to end of said cylinder. As the two cylinders revolve, the beaters on the upper are brought nearly into contact with the teeth on the lower cylinder, the space between them being merely such as will allow the fibers of cotton to pass between them, while the seeds are beaten back and separated from the fibers by the action of the beaters. The cotton thus separated is removed from the toothed cylinder by a brush-cylinder in the ordinary way.

The manner in which I usually form my toothed cylinder is as follows: I take iron wire of a suitable size—say of about one-eighth of an inch in diameter—and this I draw through holes in a draw-plate, so as to bring it into a triangular form, making one of the angular edges more acute than the other two, and then by means of a suitable machine I cut teeth along the acute edge resembling fine saw-teeth. This wire is thus prepared to be wound upon the cylinder intended to receive it, and when this has been done the toothed cylinder is completed. I make the body of the toothed cylinder hollow, and of cast-iron, and turn its surface perfectly true, and when the toothed wire is wound upon it, as above stated, it will be ready for use. Teeth might be formed upon a cylinder by other means, but at much greater labor and cost than upon the foregoing plan, and if injured from any cause the repairing of them would be attended with much trouble, while, when made in the manner above described, the repairing is accomplished with perfect facility. By winding the wire around an iron cylinder there is no danger of its coming loose by expansion from heat, and the truth of its surface is insured. The upper or beater cylinder may be formed either of wood or of iron, as may be preferred.

In the accompanying drawings, Figure 1 is a perspective view of my gin, the top or cover being removed for the purpose of exhibiting the cylinders the more plainly, and the breast-piece, which constitutes the part of the hopper for receiving the seed-cotton, being also removed for a like purpose. Fig. 2 is a vertical section of the machine from front to back.

The frame is represented as made of wood; but it will be best made of cast-iron.

A is the toothed cylinder, B is the beater, and C the brush-cylinder. The beaters $a\ a$ on the beater-cylinder may consist of strips of iron let into a cylinder of wood or attached thereto in other ways; or this cylinder may be made entirely of cast-iron and grooved or channeled out, so as to form the beaters in the solid metal. D, Fig. 2, is the breast-piece constituting the front of the hopper for containing the seed-cotton.

E is the top or cover, and F the inclined board upon which the seeds fall, and F which they are conducted to the front of the machine.

Having thus fully described the manner in which I construct my gin and explained the operation of the same, what I claim therein as new, and desire to secure by Letters Patent, is—

1. The separating the cotton from the seed by the combined operation of a cylinder covered with fine teeth formed in the manner of saw or rasp teeth, and of a beater-cylinder arranged and operating as herein set forth, the other parts of the gin being constructed in the usual manner.

2. The forming of the toothed cylinder by winding around it a cylindrical coil of wire prepared and cut with teeth, as herein set forth.

LEWIS G. STURDEVANT.

Witnesses:
    THOS. P. JONES,
    GEORGE WEST.